United States Patent
Ayoub

(10) Patent No.: US 9,376,253 B2
(45) Date of Patent: Jun. 28, 2016

(54) BEVERAGE CAPSULE WITH AN OPENING SYSTEM

(71) Applicant: NESTEC S.A., Vevey (CH)

(72) Inventor: Michael Ayoub, Crissier (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/431,361

(22) PCT Filed: Oct. 4, 2013

(86) PCT No.: PCT/EP2013/070663
§ 371 (c)(1),
(2) Date: Mar. 26, 2015

(87) PCT Pub. No.: WO2014/053614
PCT Pub. Date: Apr. 10, 2014

(65) Prior Publication Data
US 2015/0239654 A1     Aug. 27, 2015

(30) Foreign Application Priority Data

Oct. 5, 2012   (EP) .................................... 12187336

(51) Int. Cl.
| | |
|---|---|
| A23F 3/18 | (2006.01) |
| B65D 65/38 | (2006.01) |
| B65D 75/58 | (2006.01) |
| B65D 85/804 | (2006.01) |
| A23F 5/26 | (2006.01) |

(52) U.S. Cl.
CPC .............. *B65D 85/8043* (2013.01); *A23F 3/18* (2013.01); *A23F 5/262* (2013.01); *B65D 65/38* (2013.01); *B65D 75/58* (2013.01)

(58) Field of Classification Search
CPC .... B65D 85/8043; B65D 65/38; B65D 75/58; A23F 3/18; A23F 5/243; A23F 5/262

USPC ................. 426/77, 78, 79, 80, 81, 82, 83, 84; 99/295; 220/201; 222/54, 235, 325; 428/544, 545; 215/11.2; 20/0.5
See application file for complete search history.

(56) References Cited

U.S. PATENT DOCUMENTS

| | | | | |
|---|---|---|---|---|
| 3,440,997 | A * | 4/1969 | Hill | .......................... C22F 1/006 116/216 |
| 2007/0062375 | A1 * | 3/2007 | Liverani | ............. B65D 85/8043 99/279 |
| 2007/0175335 | A1 * | 8/2007 | Liverani | ............. B65D 85/8043 99/279 |
| 2011/0183057 | A1 | 7/2011 | Jones et al. | |
| 2013/0078342 | A1 * | 3/2013 | Loebl | ..................... A47J 31/005 426/115 |

FOREIGN PATENT DOCUMENTS

| | | | |
|---|---|---|---|
| WO | 2010137959 | 12/2010 | |
| WO | WO 2010137959 A1 * | 12/2010 | .......... A47J 31/3695 |

\* cited by examiner

*Primary Examiner* — Erik Kashnikow
*Assistant Examiner* — Ericson M Lachica
(74) *Attorney, Agent, or Firm* — K&L Gates LLP

(57) ABSTRACT

The present invention is directed to a beverage capsule (100) comprises a capsule body (101) with an outlet (104), a plug (111) configured to mate with said outlet (104), and an opening device (110) being at least partially fabricated from a shape-memory alloy and biased to retain said plug (111) within said outlet (104) in a first, closed position, and which is configured to deflect from said first, closed position when heated above the transition temperature of said shape-memory alloy, thereby withdrawing said plug (111) from said outlet (104) into a second, open position and permitting fluid communication through said outlet (104).

11 Claims, 2 Drawing Sheets

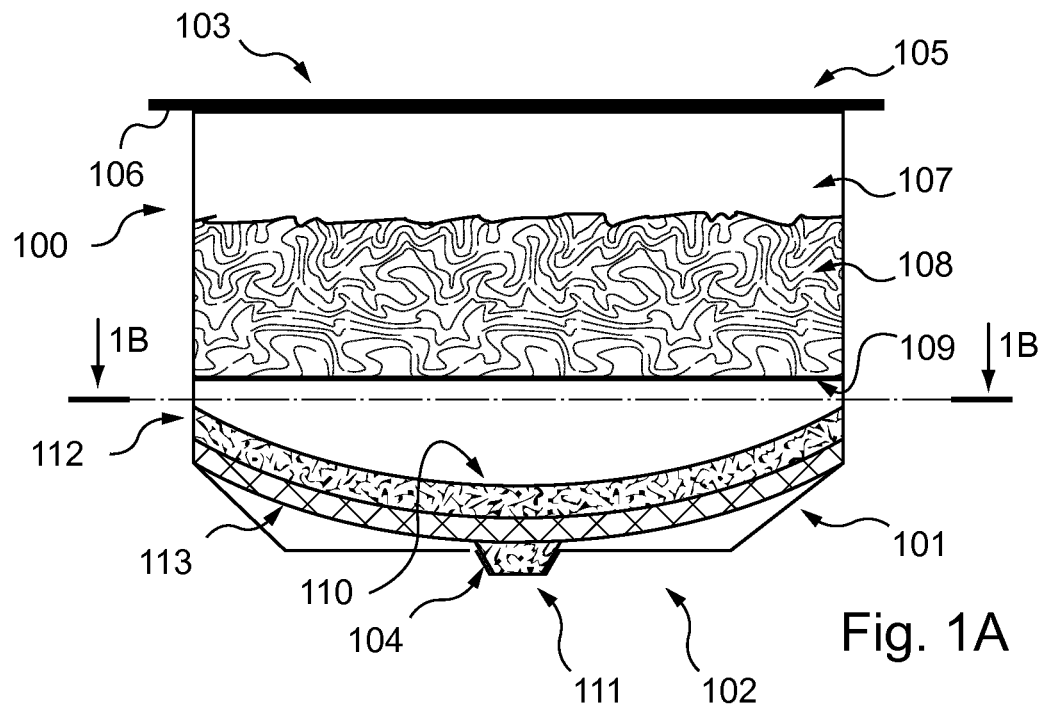
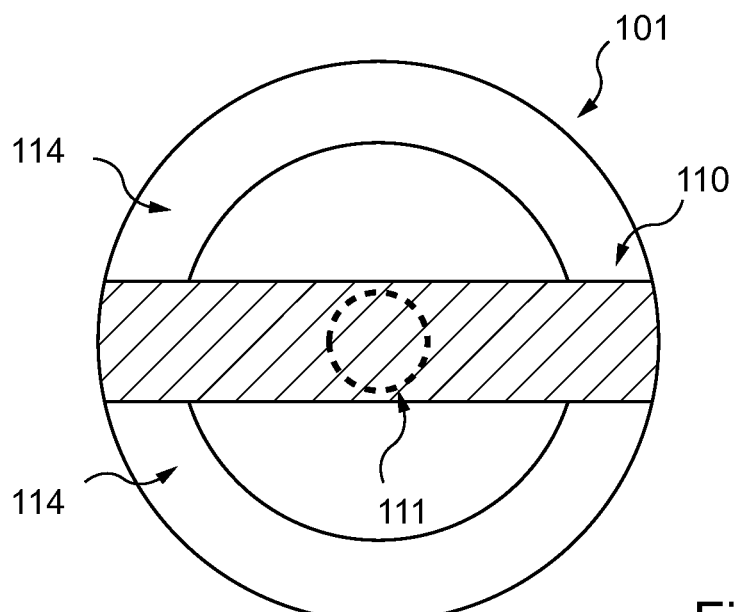
Fig. 1A
Fig. 1B

BEVERAGE CAPSULE WITH AN OPENING SYSTEM

CROSS REFERENCE TO RELATED APPLICATIONS

The present application is a National Stage of International Application No. PCT/EP2013/070663, filed on Oct. 4, 2013, which claims priority to European Patent Application No. 12187336.8, filed on Oct. 5, 2012, the entire contents of which are being incorporated herein by reference.

FIELD OF THE INVENTION

This invention relates generally to a capsule for use in a beverage machine. In particular, this invention relates to such capsules as adapted for hot beverages such as coffee or tea.

BACKGROUND

Beverage preparation machines are well-known in the food industry and consumer goods domain. Such machines allow a consumer to prepare a single serving of a beverage such as brewed coffee, espresso coffee, tea, hot chocolate drink, or the like on command.

Most beverage preparation machines for in-home use operate according to a system in which beverage ingredients are provided as individually-packaged, single-serving portions. Such portions can be soft pods, pads, or sachets, but increasingly more systems use semi-rigid or rigid portions such as rigid pods or capsules. In the following, it should be understood that the beverage machine in question is a beverage preparation machine working with a rigid or semi-rigid capsule.

In many instances, the capsules for use in beverage preparation machines are sealed. Such sealed capsules are advantageous in that they protect the ingredient contained therein from the surrounding atmosphere, improving the shelf life of the capsule. Typically, such closed capsules are made from gas- and/or moisture-impermeable material, and feature a rigid or semi-rigid body having one of its walls made from a membrane which is breached during the beverage preparation process.

The beverage machine preferably comprises a receptacle for accommodating said capsule, and a fluid injection system for injecting a fluid, preferably water, under pressure into said capsule. In most applications, the water injected into the capsule under pressure is heated, generally to a temperature above 70° C. and preferably between 80° and 90° C. However, in some particular instances it may be advantageous to inject tepid or chilled water. The pressure inside the capsule chamber during extraction and/or dissolution of the capsule contents is typically about 1 to about 8 bar for dissolution products and about 2 to about 12 bar for extraction of roast and ground coffee.

The present invention could also encompass the so-called "brewing" process of beverage preparation—particularly for tea and coffee. Brewing involves the infusion over time of the ingredient in a fluid, most commonly hot water, whereas extraction or dissolution preparations produce a beverage within a few seconds.

For purposes of clarity, however, in this document the term "brewing" of an ingredient by a fluid is understood to encompass pressurized extraction of a powdered edible material (e.g. roast and ground powdered coffee), pressurized dissolution of edible soluble material (e.g. soluble tea, coffee, milk, or cocoa), or the infusion of an edible material in an infusion fluid under very low or atmospheric pressure, for a longer time than that required for extraction or dissolution (e.g. tea leaves in hot water).

The principle of extracting and/or dissolving the contents of a closed capsule under pressure is known and consists typically of confining the capsule in a receptacle of a machine, injecting a quantity of pressurized water into the capsule to extract or dissolve the substance, and then dispensing the resulting beverage from the capsule.

The injection is generally performed by piercing a face of the capsule with a piercing injection element, such as a fluid injection needle incorporated into the machine. Capsules applying this principle have already been described, for example in applicant's European patent no. EP 1 472 156 B1, and in EP 1 784 344 B1.

In addition, machines applying this principle have already been described for example in patents CH 605 293 and EP 242 556. According to these documents, the machine comprises a receptacle for the capsule, and a perforation and injection element made in the form of a hollow needle comprising in its distal region one or more liquid injection orifices. The needle has a dual function in that it simultaneously opens the top portion of the capsule while providing an inlet channel into the capsule for the injection of the water.

The machine further comprises a supply of the fluid (usually water) that is used to prepare the beverage from the ingredient(s) contained in the capsule. The machine further comprises a heating unit such as a boiler or a heat exchanger, which heats the water used therein to the working temperature. Finally, the machine comprises a pump for circulating the water from the tank to the capsule, optionally though the heating unit. The circulation of the water within the machine may be directed via a selecting valve means, such as for instance a peristaltic valve of the type described in applicant's European patent application EP 2162653 A1.

Such systems are particularly well-adapted to the preparation of coffee. One configuration for achieving this which is particularly advantageous is to provide a capsule containing roast and ground coffee powder, which is extracted with hot water injected therein.

Capsules have been developed for such an application, which are described and claimed in applicant's European patent EP 1 784 344 B1, or in European patent application EP 2 062 831.

In short, such capsules typically comprise:
- a hollow body and an injection wall which are impermeable to liquids and to air, the wall being attached to the body and adapted to be punctured by e.g. an injection needle of the machine;
- a chamber containing a bed of roast and ground coffee to be extracted;
- an aluminium membrane disposed at the bottom end of the chamber for retaining the internal pressure therein, the membrane being associated with piercing means which create drainage holes in the aluminium membrane when the internal pressure inside the chamber reaches a certain pre-determined value; and
- optionally, a deflection means configured to break up the jet of fluid, thereby reducing the speed of the jet of fluid injected into the capsule and evenly distributing the fluid across the bed of substance at a reduced speed.

During extraction, the beverage capsule is pierced by the fluid injection needle of the beverage preparation machine, usually in the aluminium membrane. The liquid is injected in the capsule compartment and the pressure within the capsule increases, facilitating the extraction of the beverage from the ingredients contained within the capsule.

In some implementations, the beverage machine also pierces the capsule at a second location, for instance at its bottom, permitting the beverage to flow out during the operation of the machine. This therefore requires a second piercing means, appropriately disposed within the beverage machine so as to create a drain opening in the beverage capsule.

In others, the beverage capsule may be provided with an outlet, to which is generally affixed a valve or a membrane that opens when the pressure within the capsule builds up to the level required for proper beverage preparation. In one particular embodiment, the capsule is furnished with a plurality of projections. These projections are disposed within the capsule such that when the pressure within the capsule builds to a pre-determined point, the membrane will be deflected against the projections and rupture. The beverage may then flow past the projections to the outlet, usually through a plurality of channels provided among the projections for that purpose.

In WO 2010/137959, it is disclosed a system for preparing a predetermined quantity of beverage suitable for consumption using an extractable product. The system comprises an exchangeable capsule. The system further comprises an apparatus comprising a fluid dispensing device for supplying an amount of fluid, such as water, to the exchangeable capsule, a receptacle for holding the exchangeable capsule, and an outlet arrangement for supplying the beverage to a container, such as a cup. The capsule comprises a circumferential wall, a bottom, a lid, an entrance area and a closed exit area. The circumferential wall, the bottom and the lid enclose an inner space that comprises an extractable product. The system is arranged for bringing the fluid dispensing device in fluid connection with the entrance area for supplying the fluid to the extractable product for preparing the beverage. The system is further arranged so that, in use, the outlet arrangement is in fluid communication with the exit area for draining the prepared beverage from the capsule. The capsule further comprises a opening element that is arranged for providing an opening through the closed exit area for draining the prepared beverage from the capsule.

These arrangements are disadvantageous in that once the drain of the capsule is opened, it will remain so. If any liquid remains in the capsules after the brewing process is complete, it may leak from the drain when the capsule is removed from the beverage machine. This reduces the cleanliness and overall convenience of the machine.

Furthermore, when the membrane-and-projection system is used to provide the capsule drain opening, the channels which conduct the beverage past the projections may become clogged with undissolved clumps of beverage ingredient. The performance of the capsule and the quality of the beverage it produces is thus degraded.

It is accordingly an object of the invention to provide a means for opening a drain in a beverage capsule which ameliorates the above-mentioned deficiencies of the prior art.

SUMMARY OF THE INVENTION

According, therefore, to a first aspect of the invention, the invention is drawn to a beverage capsule comprising a capsule body with an outlet, characterized in that said beverage capsule comprises a plug, said plug being configured to mate with said outlet disposed in said beverage capsule; an opening device, said opening device being at least partially fabricated from a shape-memory alloy and biased to retain said plug within said outlet in a first, closed position, thereby blocking fluid communication through said outlet; wherein said opening device is configured to deflect from said first, closed position when heated above the transition temperature of said shape-memory alloy, thereby withdrawing said plug from said outlet into a second, open position and permitting fluid communication through said outlet.

The provision of a shape-memory alloy in the opening device permits it to be configured such that it rigidly assumes a pre-determined, "learned" shape when heated above the transition temperature of the alloy. The opening device is configured so that this learned shape corresponds to the second, open position with the plug extracted from the outlet. Upon the injection of the heated fluid into the capsule, the shape-memory alloy is heated above its transition temperature by the fluid and deflects into this learned shape, thereby displacing the plug from the outlet and permitting the beverage to drain from the capsule and into a container such as a cup or mug.

This is advantageous in that a beverage capsule so configured will open itself automatically at the start of the beverage preparation process.

Furthermore, the provision of a shape-memory alloy in the opening device permits the opening device to return to the first, closed position when it cools below the transition temperature of the shape-memory alloy. The beverage capsule is thus closed automatically upon the completion of the beverage preparation process.

The opening device will remain in the second, open position while heated fluid is being injected into the beverage capsule. At the completion of the beverage preparation process, the flow of heated fluid ceases and the shape-memory alloy cools, becoming ductile and susceptible to deformation. The opening device will, as a result of its bias, return to the first, closed position, replacing the plug within the outlet and re-sealing the capsule. The beverage capsule may be removed from the beverage machine and disposed of without any spilling or dripping.

The beverage capsule according to this invention is further advantageous in that the opening device of the invention improves the reliability and consistency of the brewing process. Specifically, the plug eliminates the need for the membrane and array of projections of the prior-art designs, thereby eliminating their tendency to clog with particles of beverage ingredient.

In a particularly advantageous embodiment, the opening device comprises a resilient element fabricated from an elastic material and a motive element fabricated from the shape-memory alloy. This is desirable in that the resilient element may be employed to increase the force with which the plug is held in the outlet, thereby improving the reliability of the capsule.

Finally, the opening device may be configured such that the conditions within the capsule during the beverage preparation process are ideal for the particular type of beverage selected. For instance, the geometry or modulus of elasticity of the opening device and the material properties of the shape-memory alloy may be adapted to select the pressure and/or temperature at which the plug is extracted and/or replaced within the opening. The conditions inside the capsule are thus optimized to yield high quality and consistency in the beverages produced. In this way, the beverage capsule of the present invention may be optimized for the particular application in which it is to be employed.

According to a feature, the opening device is provided in a bistable configuration, having a first stable position corresponding to said first, closed position, and a second stable position corresponding to said second, open position.

This is advantageous in that configuring the opening device with two stable dispositions, each corresponding to one of the operating positions of the opening device, means that the opening device will naturally tend to position itself in one of those two positions. During operation, then, it is therefore only necessary to provide enough force to shift the opening device between the two positions. In this way, the opening device may be simplified and the construction of the beverage capsule containing it made more economical.

According to another feature, the transition temperature of the shape-memory alloy is between 85° and 90° C.

This is advantageous in that beverage machines generally inject the liquid at a temperature between 80° and 90° C., as discussed above. Configuring the shape-memory alloy to have a transition temperature at the upper end of this range ensures that the temperature within the capsule has risen to a uniform level before the opening device opens the outlet, thereby improving the uniformity of the beverage. Furthermore, when the injection of fluid has completed, the opening device will close and the production of beverage cease before the temperature in the capsule has dropped below the optimal range for beverage preparation. This ensures that the beverage is produced under the best possible conditions and has the highest possible quality.

According to another feature, the opening device is provided as a substantially planar body upon which said plug is disposed.

This is advantageous in that the structure and fabrication of the opening device is thereby simplified. An opening device which is provided as a substantially planar body may be easily manufactured through fabrication means known in the art, such as rolling, drawing, stamping, or stretching. In this way, the advantages of the invention may be realized in the widest possible range of applications.

Furthermore, this is especially advantageous when the opening device is constructed according to the preferred embodiment mentioned above, where said opening device comprises a resilient element made of an elastic material and a motive element made from the shape-memory alloy. In such a case, the opening device may be fabricated as a laminate of the two elements, thereby permitting the advantages of this configuration to be realized in a particularly flexible and easy-to-manufacture form.

Preferably, the opening device is a substantially rectangular strip.

This is especially advantageous in that a substantially rectangular strip can be quickly and easily fabricated, often directly from stock material. The cost to fabricate an opening device according to this invention is thus further reduced.

According to another feature, the capsule body is substantially cylindrical with said outlet centrally disposed upon a face of said capsule body, said opening device disposed transversely across a cavity within said capsule body.

This is advantageous in that configuring the beverage capsule in such a way facilitates its manufacture, simply requiring one to insert the opening device into the capsule body, provide the beverage ingredient, and seal the capsule. The processes and equipment required to fabricate the beverage capsules are thereby simplified, facilitating their mass production Furthermore, the provision of an opening device as a substantially rectangular strip as described above within a substantially cylindrical capsule body will result in two passages between the edge of the opening device and the interior surface of the capsule body, disposed on either side of the opening device. Such an embodiment is especially advantageous in that the two passages permit the free flow of beverage within the beverage capsule.

According to another feature, the shape-memory alloy is a copper-aluminum-nickel or nickel-titanium shape-memory alloy.

This is advantageous in that copper-aluminum-nickel and nickel-titanium shape-memory alloys generally have transition temperatures which are suited to the range of temperatures that may be employed in the preparation of a beverage. More particularly, the alloy may be chosen such that the transition temperature of the alloy, and thus the temperature at which the opening device withdraws the plug from the outlet, is appropriate for the type of beverage that is to be prepared from any particular beverage capsule.

In addition, copper-aluminum-titanium and nickel-titanium are relatively inexpensive as compared to other shape-memory alloys. The advantages of an opening device according to the present invention are thereby realized at a minimal cost.

In this way, one may further tailor the performance of the beverage capsule opening device to the particular application in which it is to be employed, thereby realizing improved performance and economy.

According to a second aspect, the invention is directed towards a method for preparing a beverage, comprising the steps of providing a beverage capsule, said beverage capsule containing a quantity of a beverage ingredient and provided with a plug configured to mate with an outlet disposed in a face of the beverage capsule, and an opening device at least partially fabricated from a shape-memory alloy and biased to retain said plug in said outlet and block fluid communication through said outlet; injecting a quantity of a heated liquid into said beverage capsule to combine with said beverage ingredient to form a beverage, said shape-memory alloy in said opening device being thereby heated above its transition temperature and causing said opening device to deflect and withdraw said plug from said outlet; and draining said beverage through said outlet, wherein after the completion of the draining step said opening device cools below the transition temperature of said shape-memory alloy and replaces said plug within said outlet.

This is advantageous in that the preparation of a beverage according to this method will permit one to realize the advantages of the present invention. More specifically, this aspect of the invention permits one to employ a capsule containing an opening device as described above, which prevents dripping and spilling when removed from the beverage machine.

Furthermore, the preparation of a beverage according to this method is advantageous in that the use of the opening device as described above improves the consistency, and quality of the beverage produced. Since the opening device eliminates the grids and channels utilized in prior art designs, the likelihood of beverage ingredient particles clogging the capsule during the beverage preparation process is reduced. The quality of the beverage prepared is thus also rendered more consistent from serving to serving and the beverage machine rendered more reliable.

Other particularities and advantages of the invention will also emerge from the following description.

BRIEF DESCRIPTION OF THE DRAWINGS

In the accompanying drawings, given by way of non-limiting examples:

FIG. 1A depicts a side section view of a beverage capsule, prior to the preparation of a beverage;

FIG. 1B depicts a top section view of the beverage capsule of FIG. 1A;

DETAILED DESCRIPTION OF THE INVENTION

Figure 2:
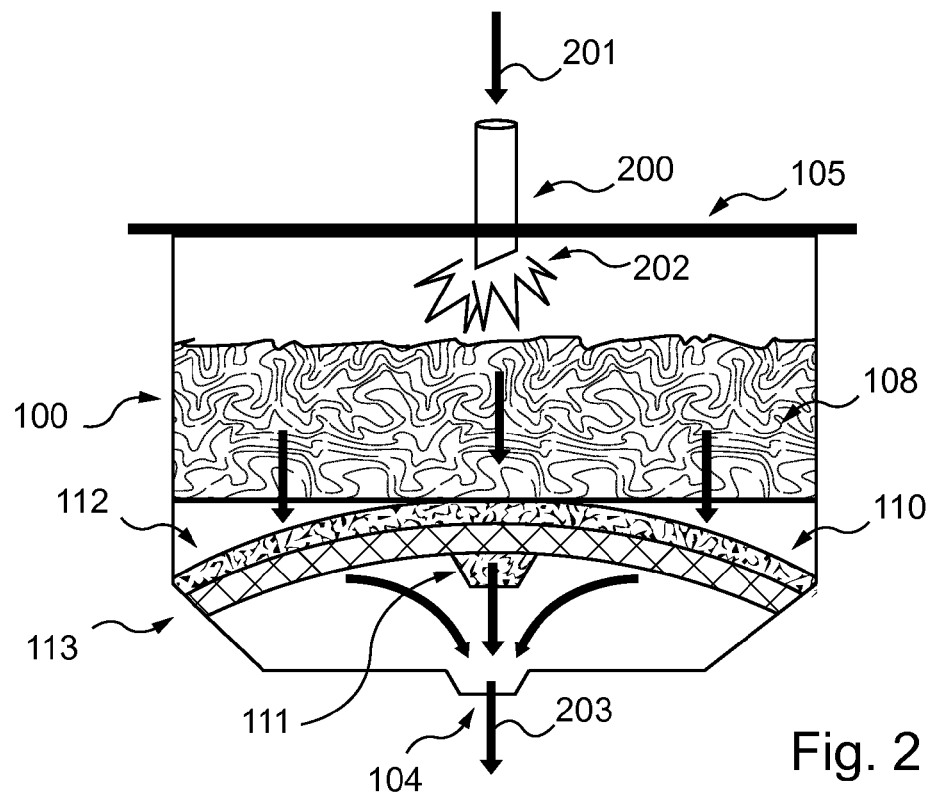
FIG. 2 depicts a side section view of the beverage capsule of FIG. 1A, during the preparation of a beverage.

FIGS. 1A and 1B depict a beverage capsule 100 incorporating an opening device according to the present invention. As depicted in FIG. 1A; the capsule 100 comprises a capsule body 101, which in the embodiment depicted here is a substantially cup-shaped structure having a face 102 and a mouth 103. The face 102 is provided with an outlet 104, while the mouth 103 is sealed by the membrane 105. The membrane 105 is generally a thin, flexible sheet, such as a foil or a plastic disc, which is glued, welded, or otherwise bonded to the capsule body 101 along a flange 106.

According to the particular application, however, other configurations of the beverage capsule may be preferable. For instance, in one alternative embodiment the beverage capsule may be fabricated from two substantially cup-shaped structures, one of which is provided an outlet, and which are bonded to each other along a flange or seam.

The capsule 100 thus encloses a cavity 107, into which a quantity of beverage ingredient 108 is placed. The beverage ingredient 108 is most commonly coffee but may be any substance or combination of substances which yield a beverage when mixed with water or another fluid. For instance, the beverage capsule may alternately contain dried tea, powdered milk, cocoa, sugar, freeze-dried broth, or the like. The beverage ingredient 108 may be packed loosely or compacted within the cavity 107.

Where the beverage ingredient does not completely dissolve into the liquid, such as with coffee grounds or tea leaves, it may also be advantageous to provide a straining element 109, to prevent the beverage ingredient from leaving the capsule 100 during the preparation of the beverage. The straining element 109 may be configured for instance as a fine mesh or screen, or may alternately be provided as a paper or fiber filter.

Within the cavity 107 and proximal to the face 102 is the opening device 110, depicted here in FIG. 1A in a first, closed position. The opening device 110 comprises, in this particular embodiment, a plug 111, a resilient element 112, and a motive element 113, the form and disposition of which will be discussed in turn.

The plug 111 is configured so as to mate with the outlet 104 and seat itself therein, blocking fluid communication through outlet 104. The plug 111 may be formed from the material most appropriate to the particular capsule configuration and beverage composition in each individual application, in order to properly seat in the outlet 104.

The resilient element 112 is fabricated from an elastic material, and disposed such that it is biased to maintain the plug 111 in the outlet 104. In the preferred embodiment, the resilient element 112 is a simple metal strip, preferably fabricated from a metal or alloy which is non-reactive with the beverage ingredient or the injection liquid.

The motive element 113 is fabricated from a shape-memory alloy (SMA) metal, preferably a copper-aluminum-titanium or nickel-titanium alloy. SMA metals have the interesting property where the metal is ductile and may be freely deformed when it is below its transition temperature, but above the transition temperature it will forcibly return itself to a previously-set shape. The motive element 113 is thus composed such that its transition temperature lies between room temperature and the temperature of the liquid injected during beverage preparation. This temperature is preferably about 90° C., though may be altered by adjusting the material properties of the SMA metal used in the motive element 113.

Thus, as FIG. 1A depicts the beverage capsule 100 prior to use, the motive element 113 is at room temperature and therefore ductile. As the plug 111, resilient element 112, and motive element 113 are cooperatively disposed, the bias of the resilient element will deform the motive element 113 and press the plug 111 into the outlet 104, thereby preventing fluid communication through said outlet 104.

In a possible embodiment, the opening device 110 is fabricated as a substantially planar body. Most preferably, this takes the form of a laminate where at least one lamina is a resilient element 112 and at least one lamina is a motive element 113. FIG. 1A depicts such a configuration, with one lamina each of the resilient and motive elements 112 and 113, and the plug 111 affixed to the motive element 113.

FIG. 1B depicts this configuration in a top view. The opening device 110 is configured as a substantially rectangular strip, with the plug 111 being disposed on the underside of said opening device 110. The opening device 110 spans the diameter of the capsule body 101, leaving two passages 114 open for the flow of the beverage. Such a configuration is particularly advantageous in that opening devices in the form of rectangular strips may be produced rapidly and at a minimum of expense in a mass-production setting.

FIG. 2 depicts the beverage capsule 100 during an injection step, wherein the beverage is prepared and dispensed from the beverage capsule 100. Generally, the beverage capsule 100 will be inserted in a beverage machine adapted to accommodate such capsule, such a beverage machine being provided with means for heating and pressurizing a quantity of liquid, injecting it into the beverage capsule 100 (most commonly by a hollow needle or the like), and a means for channeling off the beverage produced and dispensing it into a container. Such beverage machines are known in the art and for purposes of clarity will not be discussed here.

At the start of the injection step, the membrane 105 is pierced by the injection needle 200. The injection needle 200 is connected to the liquid supply 201, from which a quantity of heated liquid 202 is provided. The heated liquid 202 injected into the cavity 107 of the beverage capsule 100 through the injection needle 200.

The opening device is depicted in FIG. 2 in a second, open position. As the heated liquid 202 flows through the beverage capsule 100 in the direction 202, it will heat the motive element 113 above its transition temperature, causing it to stiffen and revert to a previously-set shape. The previously-set shape is configured such that the plug 111 is extracted from the outlet 104, as depicted in FIG. 2.

Thus, upon the injection of the heated liquid 202, the motive element 113 will overcome the bias of the resilient element 112 and force the opening device 110 to deflect upwards, thereby extracting the plug 111 from the outlet 104. The heated liquid 202 will thus combine with the beverage ingredient 108 to form a beverage 203 which flows through the outlet 104, from where it may be dispensed into a container such as a cup or mug for consumption.

Upon the completion of the injection of the heated liquid 202, the motive element 113 will begin to cool. Once the motive element 113 has reached its transition temperature, it will become ductile and no longer be capable of overcoming the bias of the resilient element 112. The resilient element 112 will therefore return the opening device 110 to its first, closed position, replacing the plug 111 in the outlet 104.

In the preferred embodiment, the opening device 110 is provided in a bistable configuration, such that it is stable in the first, closed position and in the second, open position. Since the opening device 110 is stable in both positions, it is only necessary to provide the impetus to move the opening device 110 between the two stable positions. In the preferred embodiment, the opening device 110 is stable in the first, closed position as a result of the bias of the resilient member 112, and stable in the second, open position as a result of the rigidity developed in the heated motive element 113.

Figure 3:
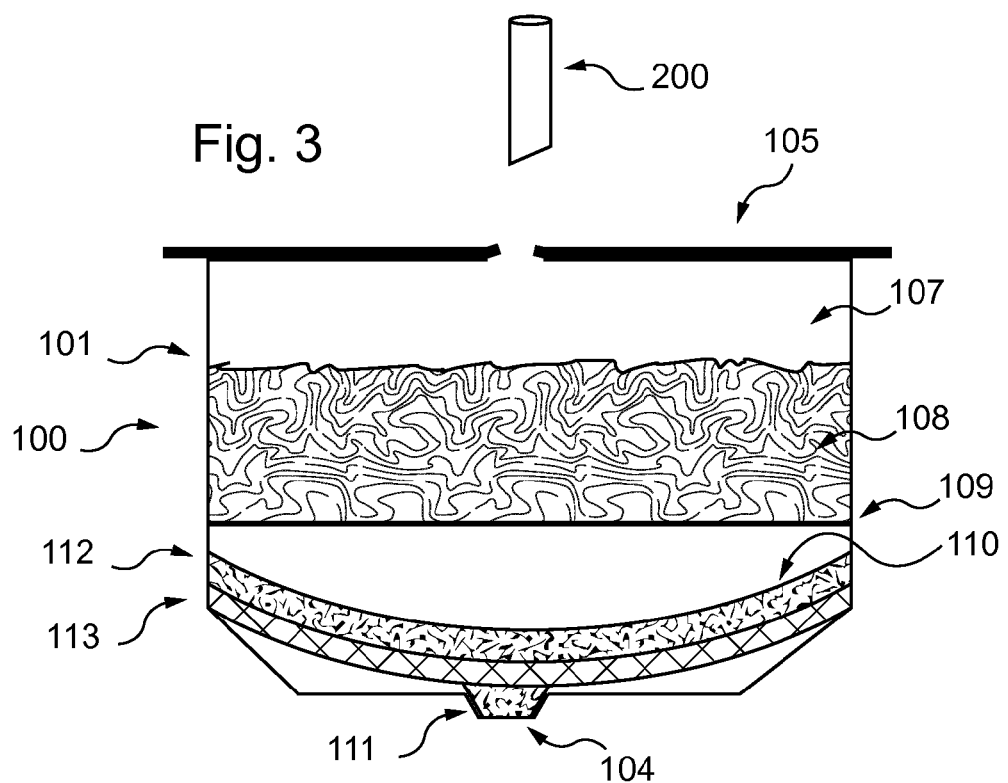
FIG. 3 depicts a side section view of the beverage capsule according to FIG. 1A, after the preparation of a beverage.

FIG. 3 depicts the beverage capsule after the completion of the injection step. The injection needle 200 is retracted from the membrane 105 of the beverage capsule 100. When the beverage ingredient is not to be totally dissolved in the heated liquid (e.g. coffee grounds), the remnants of the beverage ingredient 108 will remain in the cavity 107 of the capsule body 100, and in a possible embodiment retained in place by the straining element 109.

The opening device 110 has here returned to its first, closed position. The motive element 113, no longer heated by the injection of heated liquid, has cooled below its transition temperature and returned to its ductile state. The resilient element 112 is no longer deflected by the motive element 113 and shifts the motive element 113 and the plug 111 downwards such that the plug 111 is replaced within the outlet 104. The outlet 104 is thereby re-sealed, preventing any residual liquid from leaking from the beverage capsule 100 when removed from the beverage machine.

Of course, the invention is not limited to the embodiments described above and in the accompanying drawings. Modifications remain possible, particularly as to the construction of the various elements or by substitution of technical equivalents, without thereby departing from the scope of protection of the invention.

In particular, it should be understood that while the foregoing discussion provides an exemplary configuration of the opening device and the beverage capsule, the construction of such is not limited to the forms described therein. The shape and configuration of the components of the beverage capsule may be altered or reconfigured while still remaining within the scope of the invention.

For instance, the opening device may be provided with a different structure than the laminated rectangular strip disclosed herein. For instance, the opening device may be provided in the form of a disc or star. The resilient and motive elements may alternately be provided in a form which is not flat, such as a beam, rod, or wire.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

Although the entire specification describes the invention as a beverage capsule, it should be understood that the term "beverage" encompasses more generally non-liquid edible products, such as for instance thick soups optionally comprising solid pieces such as croutons, or viscous or jellified products such as for example, creams, ice cream, or jellies.

The invention claimed is:

1. A beverage capsule comprising a capsule body with an outlet, the beverage capsule comprises:
   a plug configured to mate with the outlet disposed in the beverage capsule; and
   an opening device at least partially fabricated from a shape-memory alloy having a transition temperature and biased to retain the plug within the outlet in a first, closed position, thereby blocking fluid communication through the outlet, wherein the plug is affixed to the opening device; and
   the opening device is configured to deflect from the first, closed position when heated above the transition temperature of the shape-memory alloy, thereby withdrawing the plug from the outlet into a second, open position and permitting fluid communication through the outlet wherein the opening device comprises a resilient element fabricated from an elastic material, and a motive element fabricated from the shape-memory alloy.

2. The beverage capsule of claim 1, wherein the opening device is provided in a bistable configuration, having a first stable position corresponding to the first, closed position, and a second stable position corresponding to the second, open position.

3. The beverage capsule of claim 1, wherein the transition temperature of the shape-memory alloy is between 85° C. and 90° C.

4. The beverage capsule of claim 1, wherein the opening device is provided as a substantially planar body upon which the plug is disposed.

5. The beverage capsule of claim 1, wherein the opening device is a substantially rectangular strip.

6. The beverage capsule of claim 1, wherein the capsule body is substantially cylindrical with the outlet centrally disposed upon a face of the capsule body, the opening device disposed transversely across a cavity within the capsule body.

7. The beverage capsule of claim 1, wherein the shape-memory alloy is selected from the group consisting of a copper-aluminum-nickel and nickel-titanium shape-memory alloy.

8. The beverage capsule of claim 1, wherein the opening device spans an entire diameter of the capsule body and comprises at least one passage for fluid communication.

9. The beverage capsule of claim 1, wherein the plug is affixed to the motive element.

10. The beverage capsule of claim 1, wherein the opening device is biased to retain the plug within the outlet in the first, closed position at a first temperature below the transition temperature of the shape-memory alloy.

11. A method for preparing a beverage, comprising the steps of:
   providing a beverage capsule, the beverage capsule containing a quantity of a beverage ingredient and provided with a plug configured to mate with an outlet disposed in a face of the beverage capsule, and an opening device at least partially fabricated from a shape-memory alloy having a transition temperature and biased to retain the plug in the outlet and block fluid communication through the outlet, wherein the plug is affixed to the opening device;
   injecting a quantity of a heated liquid into the beverage capsule to combine with the beverage ingredient to form a beverage, the shape-memory alloy in the opening device being thereby heated above the transition temperature and causing the opening device to deflect and withdraw the plug from the outlet; and
   draining the beverage through the outlet,
   wherein after the completion of the draining step the opening device cools below the transition temperature of the shape-memory alloy and replaces the plug within the outlet wherein the opening device comprises a resilient element fabricated from an elastic material, and a motive element fabricated form the shape-memory alloy.

* * * * *